A. B. FARQUHAR.
Grain-Separator.

No. 197,024. Patented Nov. 13, 1877.

7 Sheets—Sheet 1.

Attest:
Colborne Brookes
Perry B. Turpin

Inventor:
Arthur B. Farquhar
By R. S. & A. P. Lacey

7 Sheets—Sheet 3.

A. B. FARQUHAR.
Grain-Separator.

No. 197,024. Patented Nov. 13, 1877.

Attest:
Colborne Brookes
Perry B. Turpin

Inventor:
Arthur B. Farquhar
By R.S. & A.P. Lacey
attys

7 Sheets—Sheet 5.

A. B. FARQUHAR.
Grain-Separator.

No. 197,024. Patented Nov. 13, 1877.

Attest:
Colborne Brookes
Perry B. Turpin.

Inventor:
Arthur B. Farquhar
By R.S. & A.P. Lacey
attys

7 Sheets—Sheet 6.

A. B. FARQUHAR.
Grain-Separator.

No. 197,024. Patented Nov. 13, 1877.

Attest:
Colborne Brookes
Perry B. Turpin

Inventor:
Arthur B. Farquhar
By R.S. & A. P. Lacey
attys

A. B. FARQUHAR.
Grain-Separator.

No. 197,024. Patented Nov. 13, 1877.

Attest:
Colborn Brookes
Perry B. Turpin.

Inventor:
Arthur B. Farquhar
By R.S. & A.P. Lacey
attys.

UNITED STATES PATENT OFFICE.

ARTHUR B. FARQUHAR, OF YORK, PENNSYLVANIA.

IMPROVEMENT IN GRAIN-SEPARATORS.

Specification forming part of Letters Patent No. 197,024, dated November 13, 1877; application filed June 20, 1877.

*To all whom it may concern:*

Be it known that I, ARTHUR B. FARQUHAR, of York, in the county of York and State of Pennsylvania, have invented certain new and useful Improvements in Grain-Separators; and I do hereby declare that the following is a full, clear, and exact description thereof, which will enable others skilled in the art to which it pertains to make and use the same, reference being had to the accompanying drawing, and to the letters of reference marked thereon, which form a part of this specification.

My invention relates to improvements in separators, thrashers, and cleaners; the nature of which will be fully understood from the following description, by reference to the accompanying drawings, in which—

Figure 1:
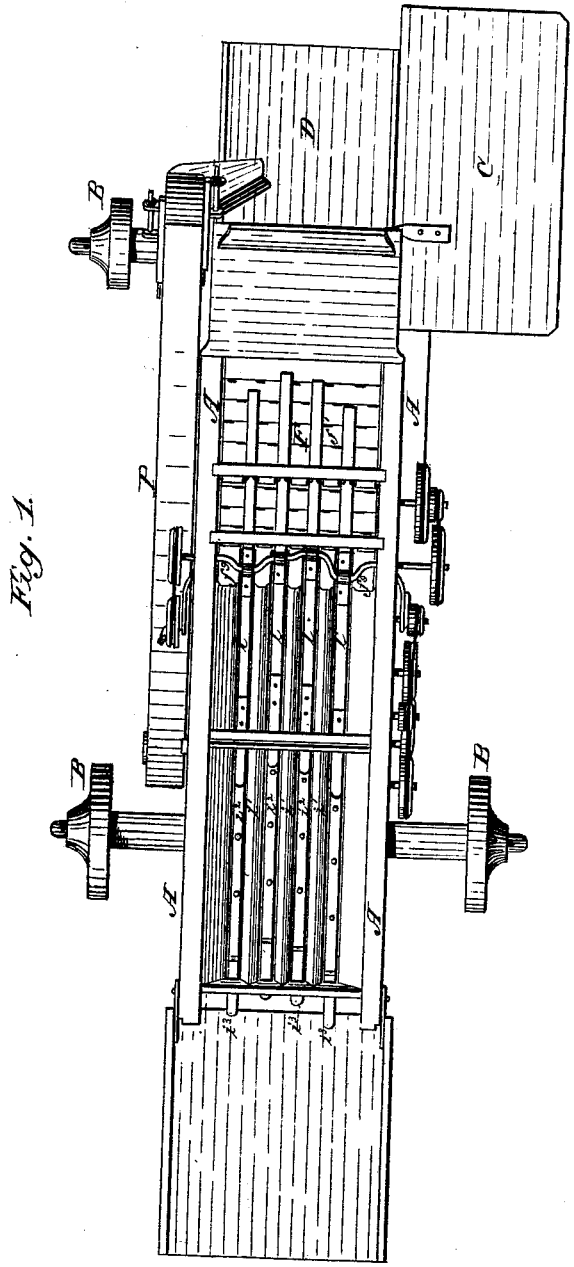
Figure 2:
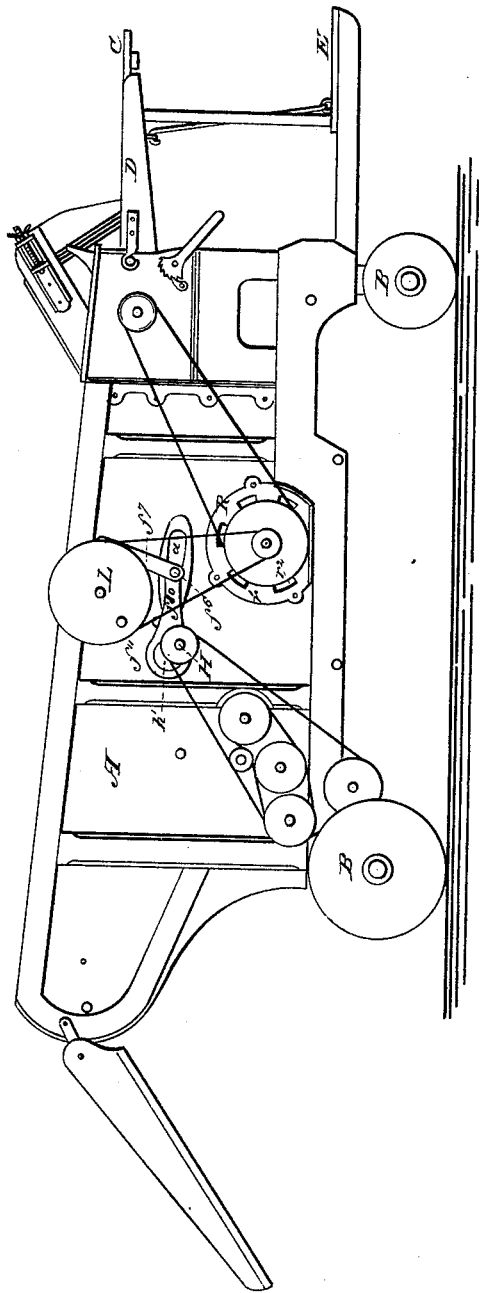
Figure 3:
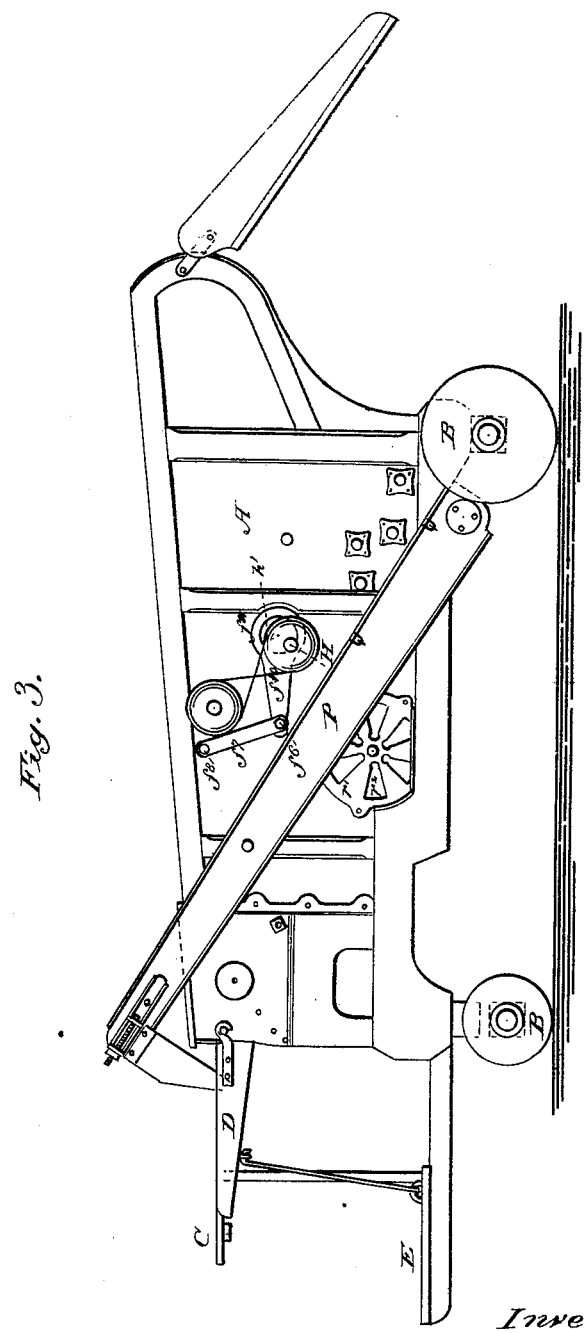
Figure 4:
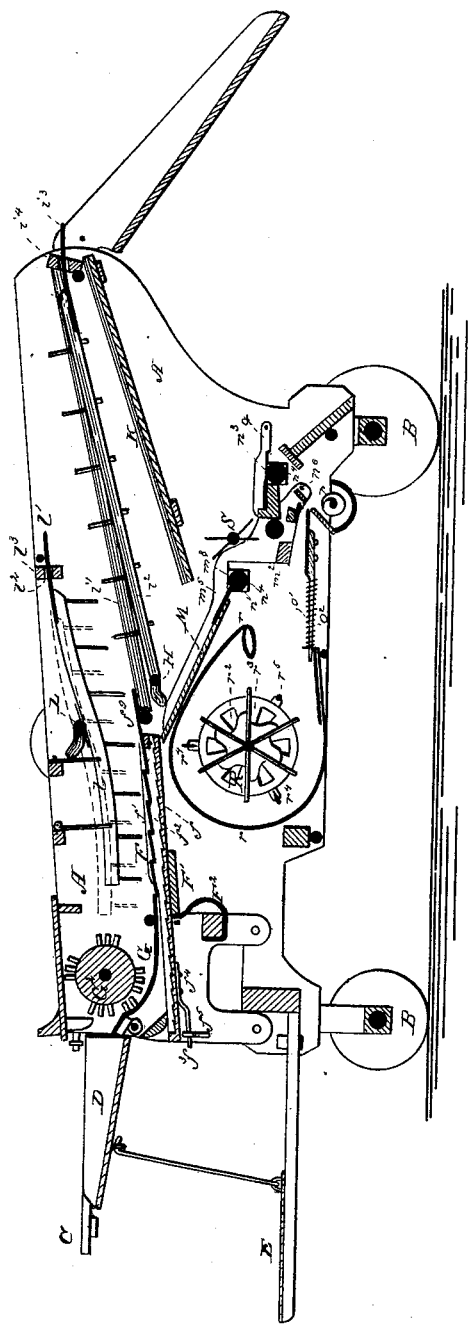
Figure 5:
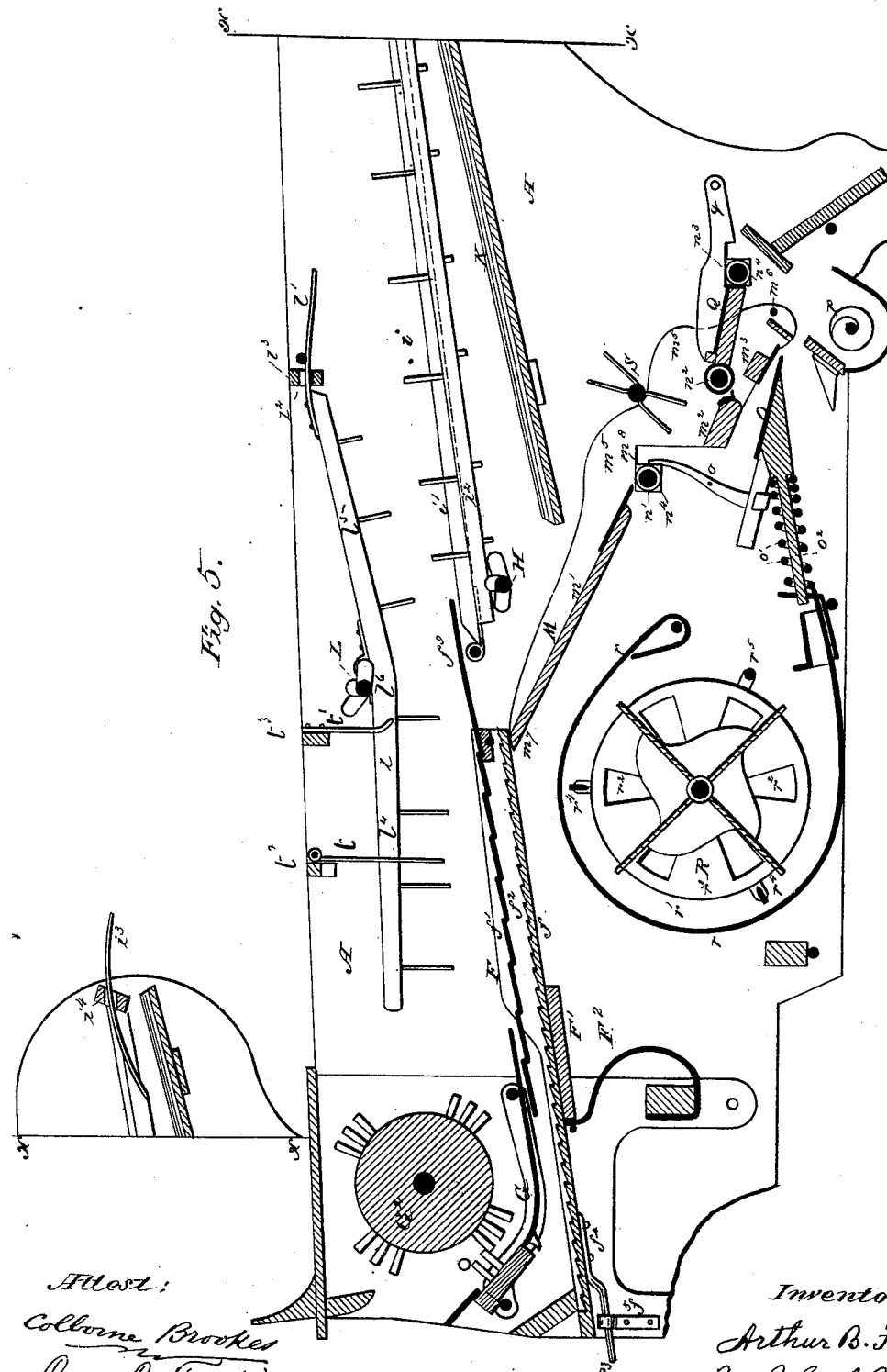
Figure 6:
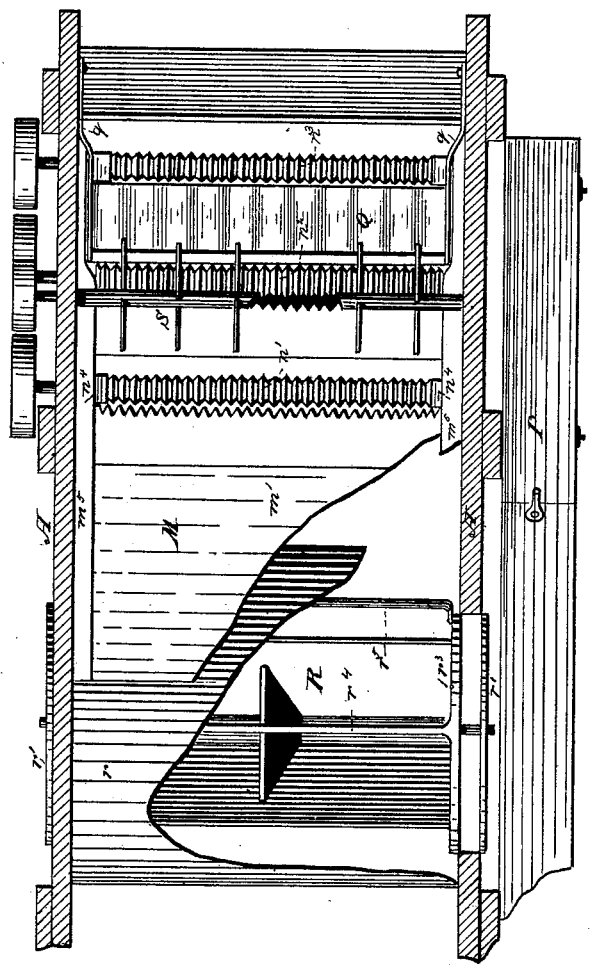
Figure 7:
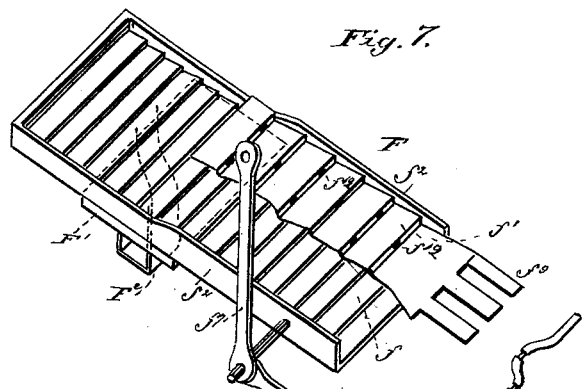
Figure 8:
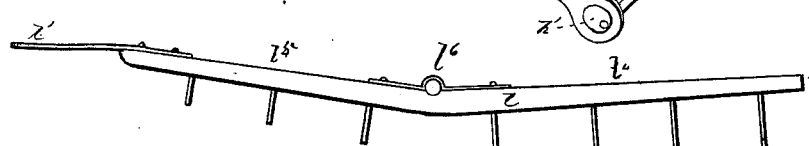
Figure 9:
Figure 10:
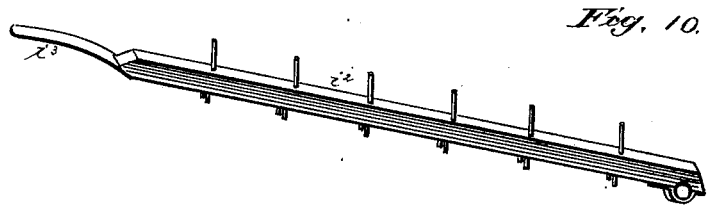

Figure 1 represents a plan; Figs. 2 and 3, opposite side views; Fig. 4, a sectional view through the entire machine; Fig. 5, a partial section on a larger scale; and Fig. 6 represents a sectional plan of the separator-shoe; Fig. 7, a perspective view of the conveyer F; Figs. 8, 9, and 10, detail views of parts; Fig. 11, a view of the sheaf-board.

In each of the views similar letters of reference are employed to indicate corresponding parts wherever they occur.

A A represent the main framing, in which are formed the bearings for the various working parts. The framing A is mounted on wheels B B in the usual manner, to facilitate transportation from place to place. C represents the sheaf-board or side table, D the feed-board or apron, and E the platform.

The sheaf-board or side table C is attached to the apparatus by means of the eye or loop $c$, by preference formed on the end of a plate, $c^1$, affixed to the upper surface of the board C, and adapted to be received onto a pin or stud, $c^2$, carried by the end of the framing A, and and also by means of a loop or eye, $c^3$, formed on the end of a pivoted lever, $c^4$, which turns on a pivot, $c^5$, carried by the under side of the board C. The pivoted lever $c^4$ is provided with an enlargement, $c^6$, in which is formed a slot for the reception of a regulating-stop, $c^7$, affixed to the table C.

The loop $c^3$ is adapted to be brought into position by turning the lever $c^4$ on its pivot, so that it may be received onto a hook, $c^8$, formed on or affixed to the feed board or apron D, when, by turning the lever $c^4$ in the opposite direction, the eye will be pressed firmly onto the hook $c^8$, as shown more clearly by Fig. 8, and there held until the board is required to be removed.

The straw, in the operation of my machine, is carried away from the cylinder $G^2$ in a platform composed of a vibrating or oscillating conveyer, F, an intermediate grating, $f^9$, and a fixed grating, $i$, composed of longitudinal bars $i^1$, between which are operated a series of rakes, $i^2$, hereinafter described.

The vibrating-conveyer F is placed in the forward end, and the grating $i$ in the rear or discharge end of the machine, with an intervening space, which admits of the full play of the conveyer, and affords an ample opening, through which the grain is discharged to the chute below. This intervening space between the conveyer and fixed grating is provided with an intermediate grating, which prevents the straw from falling through into the machine.

F is the conveyer, composed of the two carriers $f f^1$, framed together by the side pieces $f^2$, so as to provide ample intermediate space for the passage of the grain outward on the under carrier. These carriers are made step-formed, as shown, for purposes well known in grain-separators, and the upper carrier $f^1$ is suitably perforated to permit the grain to drop through on the carrier $f$. The carrier $f$ is extended, under the concave G, to the front end of the machine, as shown, and is thus adapted to catch all grain which, from any circumstance, would fail of being first carried forward onto the carrier $f^1$. The carrier $f^1$ has its front end extended under the rear end of the concave G, so that in the shaking or to-and-fro movement of the conveyer there will be preserved a continuous platform between the concave and this carrier.

The conveyer, at its front end, is supported by means of rods $f^3$, with capability of a free oscillating movement in bearings $f^5$ on the frame A. Its rear end is supported by laterally-extending rods $f^6$, which pass through slots and into bearings in the free end of the swinging levers $f^7$, pivoted to the outer side of the frame A.

The intervening space between the conveyer F and the grating $i$ is provided with the intermediate grating $f^9$, which, by preference, is made a part and an extension of the carriers $f^1$. By the use of this intermediate grating I am enabled to construct machines wherein the conveyer F and grating $i$ are in different inclines or planes. The grating $f^9$ may be inclined to any desired angle to make a suitable plane of communication between the conveyer and grating $i$.

In constructing the straw or separating platform in the three parts described, I lessen the weight of the separating devices necessary to be moved in the operation of the machine, while the heavy separated grain is soon discharged from the short carrier $f$ onto the chute below, thus enabling me to operate the conveyer F and rakes $i$ with much less power than is required in machines of ordinary constructions.

The lower rakes $i^2$ are journaled at their front ends to the eccentric cranks on the shaft I, and work between the bars $i^1$ of the grating $i$. Their rear ends are furnished with the curved bearing-plates $i^3$, which slide in bearings in the cross-bar $i^4$.

On the ends of the crank-shaft I, and without the frame A, are placed the eccentric cranks $h'$, to which are suitably attached one end of the arms $f^{10}$, the opposite ends of which are attached to the rods $f^6$ on the conveyer F. On one end of the shaft I is placed the pulley, through which motion is imparted to the rakes $i^2$ and conveyer F.

By having the conveyer F and rakes $i^2$ connected in the manner described and operated by the single pulley, a uniform and steady movement of the shaking and separating apparatus is secured. Below the rakes $i^2$ is placed the grain-returning board $k$, formed with channels corresponding with the rakes $i^2$.

$F^2$ is a supporting-spring the lower end of which is fixed centrally on the cross-bar $F^3$, while the upper end rests centrally against the under side of the conveyer F and against the front side of the cleat $F^1$, as shown. It supports the rear end of the conveyer F and relieves the weight on the bearings $f^5$, which serve as guides rather than bearings. It permits a free to-and-fro movement, and acts as a counterbalancing-spring to move the conveyer. The conveyer, by being supported by the spring $F^2$, is more easily operated, there being little or no friction in the bearings or guides $f^5$.

The upper rakes $l$ are composed of the front and rear arms $l^4$ $l^5$, bent upward at $l^6$, at which point they are provided with boxing or other suitable means, by which they are secured to the eccentric cranks on the shaft L. They are provided at their rear ends with the curved bearing-plates $l^1$, which slide in stationary bearing in the cross-bars $l^3$, placed at or near the top of the framing A, and in the rear of a vertical line from the front end of the grating $i$, so that in the operation of the machine the rear ends of rakes $l$ overlap the front ends of rakes $i^2$.

The arms $l^4$ $l^5$ are bent to such an angle at $l^6$ that when the eccentric crank to which any given rake is journaled is in a vertical line below its center of motion, the rear arm $l^5$ will incline upward to its bearing in the bar $l^3$, and the front arm $l^4$ will be parallel with, its teeth almost touching, the surface of the conveyer F. By this construction a greater sweep is obtained for the rakes, the front ends are lifted higher and are brought down close to the cap over the cylinder, and the teeth grapple the straw at the end of the concave G, and the ends of the rakes cannot become entangled with, and the almost horizontal movement of the arms $l^4$ will remove from the conveyer F every particle of straw.

The arms $l^5$ have a sweeping upward movement, which carries the straw over the intermediate grating $f^9$ and onto the grating $i$, where it is caught, and along which it is carried by the under rakes $i^2$.

$t$ $t^1$ are two series of pendent arms supported on cross-bars $t^2$ $t^3$. The arms $t$, being hinged, have a free swinging movement, while the arms $t^1$ are rigid and are placed in rear of the arms $t$. They serve as clearing devices to force the straw downward off the teeth of the rakes $l$.

The straw, in the rapid movement of the rakes, is lifted from the conveyer, and is carried forward and brought forcibly in contact with the hinged arms $t$, which, by their gravity, force it slightly downward with a pounding movement, which causes the grain to settle or fall onto the conveyer. It is then carried forcibly against the rigid arms $t^2$, which force it rapidly downward to the points of the teeth, from which it is discharged with a tossing or pitching movement onto the intermediate grating $f^9$, where it is again caught by the teeth on the rear arms $l^5$, and carried or tossed up onto the grating $i$.

It will thus be seen that the straw, in passing from the cylinder over the conveyer, is subjected to the triple action of the shaking, pounding, and tossing, which movements remove from it almost every particle of grain before it is deposited on the grating $i$ for the action of the rakes $i^2$, which convey it to the rear end and discharge it from the machine.

M is an inclined grain-chute carried by arms $m$. This chute is divided into sections $m^1$ $m^2$ $m^3$, each of which is provided with a finger-plate, $m^4$.

The sections $m^1$ $m^2$ $m^3$ of the chute M are carried by arms $m^5$, which at their rear ends are supported on pivots or studs $m^6$, carried by the main framing A, while the front end $m^7$ of the chute M is free.

An up-and-down shaking motion is communicated to the chute M by means of the surfaces $m^8$, which engage with square or other suitably-formed extensions or cam-surfaces $n^4$ formed on the end of the first $n^1$ of the series of grooved or other fluted rollers $n^1$ $n^2$ $n^3$.

O represents a perforated riddle or screen, which is operated in one direction by an arm, $o$, which receives motion from the surface $n^4$ of the roller $n^1$, while it is forced backward by means of the springs $o^1$ arranged around the guiding-shaft $o^2$.

$p$ is the tailings-conveyer, and P the tailings-elevator. Q is the tailings shoe or board, and is fluted and carried by pivoted arms $q$, operated by square or other suitably-formed surfaces $n^4$ on the ends of the fluted roller $n^3$. R is the fan, which is arranged within the fan-case $r$. $r^1$ are the end plates of the fan-case, which are provided with openings $r^2$, regulated by correspondingly-formed plates $r^3$.

The plates $r^3$ are connected together by cross-bars $r^4$ $r^4$ $r^5$, the cross-bars $r^4$ being formed flat or knife-shaped, in order that the blast may act upon the same, and automatically cause the partial revolution of the plates $r^3$, and thereby close the openings $r^2$ when the blast becomes too strong. The draft to the fan may be regulated from the exterior by means of a knob or handle on one or both of the plates $r^3$.

It will be observed that the first set of rakes $i^2$ play over the top of the second set $l$, in such manner that the straw is most thoroughly shaken, and all the grain dropped therefrom.

S is a rotary agitator arranged over the mouth of the fan Q, for the purpose of stirring up any wet clots of chaff that may get on the chute M.

Having thus described my invention, what I claim, and desire to obtain by Letters Patent, is—

1. In a separator or thrasher and cleaner, the sheaf-board or side table constructed with a loop or eye, $c^3$, carried by a pivoted lever, $c^4$, and engaging with a hook, $c^6$, substantially as and for the purpose described.

2. The conveyer F, constructed with a bottom, $f$, and screen or riddle $f^1$, framed to and arranged above the bottom $f$, the screen or riddle $f^1$ being formed with extensions $f^9$, extending over the ends of the bar $i$, and between the lower rakes $i^2$, substantially as set forth.

3. In combination with the conveyer F, rakes $i^2$, and intermediate grating $f^9$, composing the separating-platform, and arranged as described, the bent rakes $l$, journaled to the crank L above the separating-platform, with their rear ends supported in bearings $l^3$, so that they operate over the conveyer and the intermediate grating $f^9$, and over the front ends of the rakes $i^2$, substantially as shown, and for the purposes set forth.

4. The combination, with a series of rakes, $l$, supported and operated by a crank-shaft, L, above the conveyer F, of a series of hinged pendent arms, $t$, and a series of rigid pendent arms, $t^1$, arranged as and for the purpose set forth.

5. In combination with a conveyer, F, provided with guide-rods $f^3$ moving in guide-bearings $f^5$ on the frame A, of a supporting spring-bar, F$^2$, arranged centrally below the rear end of the conveyer F, for the purposes set forth.

6. The combination, with the conveyer F and intermediate grating $f^9$, of the rakes $l$, constructed with the arms $l^4$ $l^5$, supported, arranged, and operating substantially as set forth.

7. The combination of the incline grain-chute M, formed with a series of sections, $m^1$ $m^2$ $m^3$, rollers $n^1$ $n^2$ $n^3$, agitator S, and fan R, substantially as set forth.

8. The combination, with the conveyer F, intermediate grating $f^9$, and grating $i$, of the series of rakes $i^2$, operating between the bars of the grating $i$, and the series of curved or bent rakes $l$, supported and operated over and partially in the rear of the series of rakes $i^2$, substantially as set forth.

In testimony that I claim the foregoing as my own I affix my signature in presence of two witnesses.

ARTHUR B. FARQUHAR.

Witnesses:
A. W. SHETTER,
GEORGE M. SHETTER.